US012027757B2

(12) United States Patent
Zhou

(10) Patent No.: US 12,027,757 B2
(45) Date of Patent: Jul. 2, 2024

(54) HOUSING ASSEMBLY AND ELECTRONIC DEVICE

(71) Applicant: GUANGDONG OPPO MOBILE TELECOMMUNICATIONS CORP., LTD., Dongguan (CN)

(72) Inventor: Lin Zhou, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 231 days.

(21) Appl. No.: 17/671,389

(22) Filed: Feb. 14, 2022

(65) Prior Publication Data

US 2022/0173503 A1 Jun. 2, 2022

Related U.S. Application Data

(63) Continuation of application No. PCT/CN2020/107486, filed on Aug. 6, 2020.

(30) Foreign Application Priority Data

Aug. 19, 2019 (CN) ......................... 201910765952.5

(51) Int. Cl.
*H01Q 1/24* (2006.01)
*H01Q 1/38* (2006.01)
(Continued)

(52) U.S. Cl.
CPC ............... *H01Q 1/243* (2013.01); *H01Q 1/38* (2013.01); *H01Q 1/44* (2013.01); *H01Q 1/48* (2013.01); *H01Q 1/50* (2013.01)

(58) Field of Classification Search
CPC ............ H01Q 1/243; H01Q 1/38; H01Q 1/44; H01Q 1/48; H01Q 1/50; H01Q 1/36; H01Q 9/0421; H01Q 1/22
See application file for complete search history.

(56) References Cited

U.S. PATENT DOCUMENTS 9,876,270 B2 * 1/2018 Liu ........................ H01Q 1/243
2010/0053002 A1 3/2010 Wojack et al.
(Continued)

FOREIGN PATENT DOCUMENTS

CN 101466214 A 6/2009
CN 106910977 A 6/2017
(Continued)

OTHER PUBLICATIONS

Extended European Search Report dated Sep. 12, 2022 received in European Patent Application No. EP20855786.8.
(Continued)

*Primary Examiner* — Seung H Lee
(74) *Attorney, Agent, or Firm* — Sheppard, Mullin, Richter & Hampton, LLP

(57) ABSTRACT

Provided is a housing assembly and electronic device. The housing assembly may include a main body including side edge, and a metal frame including a bezel portion and a carrying portion. The bezel portion can be connected to the side edge and may cooperatively define an accommodating portion with the main body. The carrying portion being located in the accommodating portion and disposed along a connecting line between the bezel portion and the main body. The carrying portion may include a metal arm. A first groove being defined between the carrying portion and the bezel portion, a second groove being defined between the carrying portion and the main body, the first groove being connected to the second groove. The metal arm being configured to form an antenna radiator.

18 Claims, 5 Drawing Sheets

(51) Int. Cl.

| | |
|---|---|
| ***H01Q 1/44*** | (2006.01) |
| ***H01Q 1/48*** | (2006.01) |
| ***H01Q 1/50*** | (2006.01) |

(56) References Cited

U.S. PATENT DOCUMENTS

| | | | |
|---|---|---|---|
| 2014/0184449 A1 | 7/2014 | Dong et al. | |
| 2014/0347227 A1 | 11/2014 | Iellici et al. | |
| 2018/0026338 A1 | 1/2018 | Lin et al. | |
| 2018/0166772 A1 | 6/2018 | Wei et al. | |
| 2018/0241430 A1 | 8/2018 | Youn et al. | |
| 2019/0006738 A1 | 1/2019 | Yu et al. | |
| 2019/0007085 A1 | 1/2019 | Youn et al. | |
| 2020/0153088 A1* | 5/2020 | Hill | G06F 1/1656 |

FOREIGN PATENT DOCUMENTS

| | | | |
|---|---|---|---|
| CN | 107087364 | A | 8/2017 |
| CN | 107113348 | A | 8/2017 |
| CN | 206713212 | U | 12/2017 |
| CN | 108039582 | A | 5/2018 |
| CN | 108174541 | A | 6/2018 |
| CN | 108417966 | A | 8/2018 |
| CN | 108925073 | A | 11/2018 |
| CN | 109302519 | A | 2/2019 |
| CN | 109905505 | A | 6/2019 |
| CN | 110459872 | A | 11/2019 |
| EP | 3383004 | A1 | 10/2018 |
| KR | 20170130820 | A | 11/2017 |

OTHER PUBLICATIONS

International Search Report and Written Opinion dated Sep. 30, 2020 in International Application No. PCT/ CN2020/107486. English translation attached.

First Office Action from corresponding Chinese Application No. 201910765952.5, dated Aug. 25, 2020. English translation attached.

The Second Office Action from corresponding Chinese Application No. 201910765952.5, dated Mar. 9, 2021. English translation attached.

The Grant Notice from corresponding Chinese Application No. 201910765952.5, dated Jun. 15, 2021. English translation attached.

Lin, Jiayun. "Study and Design of Multi-band Mobile Phone Antenna", Chinese Master's Theses Full-text Database, Feb. 15, 2018, full text.

* cited by examiner

HOUSING ASSEMBLY AND ELECTRONIC DEVICE

The present disclosure is a continuation application of an International Application No. PCT/CN2020/107486, filed on Aug. 6, 2020, which claims priority to Chinese Patent Application No. 201910765952.5, filed on Aug. 19, 2019, and entitled "Housing Assembly and Electronic Device", the disclosure of which are hereby incorporated by reference in their entirety.

TECHNICAL FIELD

The present disclosure relates to electronic technology, and more particularly, to a housing assembly and electronic device.

BACKGROUND

With the development of electronic technology, users can realize more and more functions through electronic devices such as smart phones, especially various network functions, such as voice calls, video chats, online games, etc.

In the process of voice calls, video chats and online games, the electronic devices need to communicate with base station or server for data interaction, and in the process of data interaction, the electronic devices need to transmit Radio-Frequency (RF) signals through antenna.

On the other hand, with the development of electronic technology, electronic devices are getting smaller and thinner, and the internal space of electronic devices is getting smaller. Thus, how to reasonably design the antenna to save the internal space of electronic devices becomes a problem in the field.

SUMMARY

The present disclosure provides a housing assembly and an electronic device.

In a first aspect, the present disclosure provides a housing assembly, the housing assembly includes a main body and a metal frame. The main boy includes a side edge, the metal frame includes a bezel portion and a carrying portion. The bezel portion is connected to the side edge and extends along a thickness direction of the main body. The bezel portion and the main body cooperatively defines an accommodating portion. The carrying portion is located in the accommodating portion and disposed along a connecting line between the bezel portion and the main body. The carrying portion includes a metal arm. A first groove is defined between the metal arm and the bezel portion, and a second groove is defined between the metal arm and the main body. The first groove is connected to the second groove. The metal arm is configured to form an antenna radiator.

In a second aspect, the present disclosure provides an electronic device, the electronic device includes a housing assembly and a back cover. The housing assembly includes a main body and a metal frame. The main body includes a side edge, the metal frame includes a bezel portion and a carrying portion. The bezel portion is connected to the side edge and extends along a thickness direction of the main body. The bezel portion and the main body cooperatively defining an accommodating portion. The carrying portion is located in the accommodating portion and disposed along a connecting line between the bezel portion and the main body. The carrying portion comprising a metal arm. A first groove is defined between the metal arm and the bezel portion, and a second groove is defined between the metal arm and the main body. The first groove is connected to the second groove. The metal arm is configured to form an antenna radiator. The back cover is connected to the carrying portion.

BRIEF DESCRIPTION OF DRAWINGS

To clearly explain technical solutions of embodiments of the present disclosure, drawings used in embodiments are briefly described below. The drawings as described below are merely some embodiments of the present disclosure. Based on these drawings, other obvious variants can be obtained by those skilled in the art without creative effort.

DESCRIPTION OF EMBODIMENTS

The technical solutions of embodiments of the present disclosure will be clearly and completely described below in conjunction with the drawings. It should be understood that the described embodiments are not limiting and are not the only contemplated embodiments of the present disclosure. Based on the embodiments in the present disclosure, all other variants obtained by a person skilled in the art without creative effort shall fall within the scope of protection of the present disclosure.

An electronic device is provided according to an embodiment of the present disclosure. The electronic device may be a device such as a smartphone, a tablet computer, etc., and may also be a gaming device, an Augmented Reality (AR) device, an automotive device, a data storage device, an audio playback device, a video playback device, a laptop computer, a desktop computing device, etc.

Figure 1:
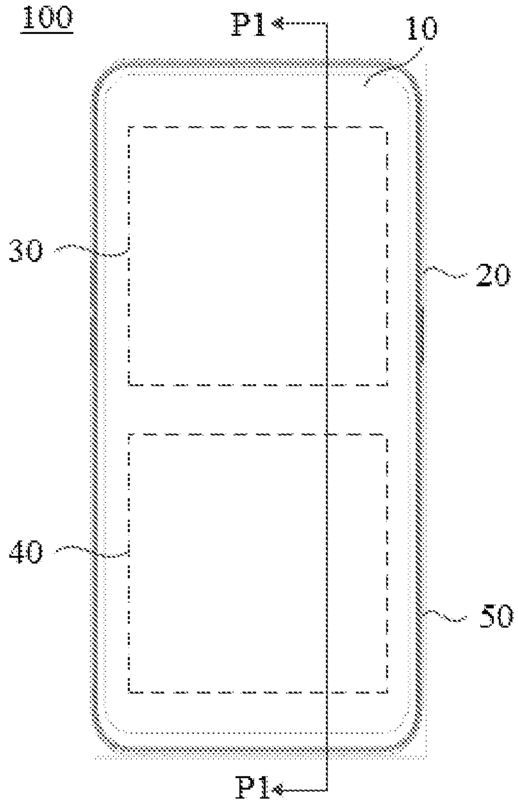
FIG. 1 is a schematic front view of an electronic device in accordance with an embodiment of the present disclosure.
Figure 2:
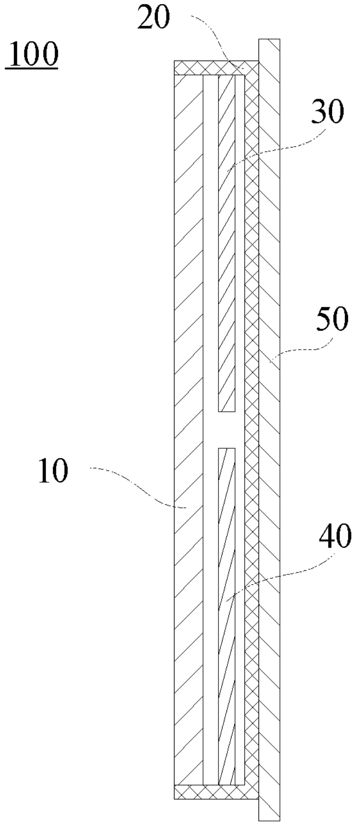
FIG. 2 is a section view of the electronic device along with profile line P1-P1 shown in FIG. 1.

As illustrated in FIG. 1 and FIG. 2, wherein FIG. 1 is a schematic front view of an electronic device 100 according to an embodiment of the present disclosure, and FIG. 2 is a section view of the electronic device 100 along with profile line P1-P1 shown in FIG. 1.

The electronic device 100 includes a display 10, a housing assembly 20, a circuit board 30, a battery 40, and a back cover 50.

The display 10 is mounted on the housing assembly 20 to form a display surface of the electronic device 100 for displaying information such as images, text, etc. The display 10 may include a Liquid Crystal Display (LCD) or an Organic Light-Emitting Diode Display (OLED).

The display 10 may also be provided with a cover plate to protect the display 10 from being scratched or damaged by water. The cover plate may be a transparent glass cover plate, so that the content displayed on the display 10 can be observed by a user through the cover plate. The cover plate may be a sapphire glass cover plate, for example.

The housing assembly 20 may be a sheet or have a lamellar structure, or a hollow frame structure. The housing assembly 20 is configured to provide support for electronic components or functional assemblies in the electronic device 100. For example, the housing assembly 20 may be provided with recesses, projections, through-holes, and other structures on/in which to mount the electronic components or functional assemblies of the electronic device 100. The housing assembly 20 may be a middle frame of the electronic device 100.

The housing assembly 20 and the back cover 50 may form a housing together for accommodating the electronic components and functional assemblies of the electronic device 100. For example, cameras, receivers, circuit boards, battery, and other functional components of the electronic device 100 may be mounted to the housing assembly 20 for securing and accommodating such components within the housing. The material of the housing assembly 20 may include some form or type of metal or plastic or combination thereof, or other appropriate material.

The circuit board 30 is mounted inside the housing formed by the housing assembly 20 together with the back cover 50. For example, the circuit board 30 may be mounted on the housing assembly 20 and accommodated inside the housing. The circuit board 30 may be a main board of the electronic device 100. The circuit board 30 may be provided with an RF (Radio Frequency) circuit. The RF circuit is configured to generate RF signals and transmit the RF signals via an antenna radiator of the electronic device 100, and process RF signals received by the antenna radiator. In addition, one or more functional assemblies such as microphones, speakers, receivers, headphone interfaces, cameras, accelerometers, gyroscopes, and processors may be integrated on the circuit board 30. The display 10 may be electrically connected to the circuit board 30, and being controlled by a processor mounted on the circuit board 30.

The battery 40 is mounted inside the housing formed by the housing assembly 20 together with the back cover 50. For example, the battery 40 may be mounted to the housing assembly 20 and accommodated inside the housing. The battery 40 is electrically connected to the circuit board 30 to enable the battery 40 to power the electronic device 100. The circuit board 30 may be provided with a power management circuit. The power management circuit is configured to allocate the voltage provided by the battery 40 to the various electronic components in the electronic device 100.

The back cover 50 is connected to the housing assembly 20. For example, the back cover 50 may be attached to the housing assembly 20 by an adhesive such as a double-sided adhesive. The back cover 50 is configured to seal the electronic components and functional assemblies of the electronic device 100 inside the electronic device 100 in conjunction with the housing assembly 20 and the display 10 to protect the electronic components and the functional assemblies. The back cover 50 may also be referred to as a battery cover. It is understood that the back cover 50 may be molded in one piece. A structure such as a rear camera mounting hole may be defined in the back cover 50. The rear camera mounting hole may be formed during the molding of the back cover 50.

Figure 3:
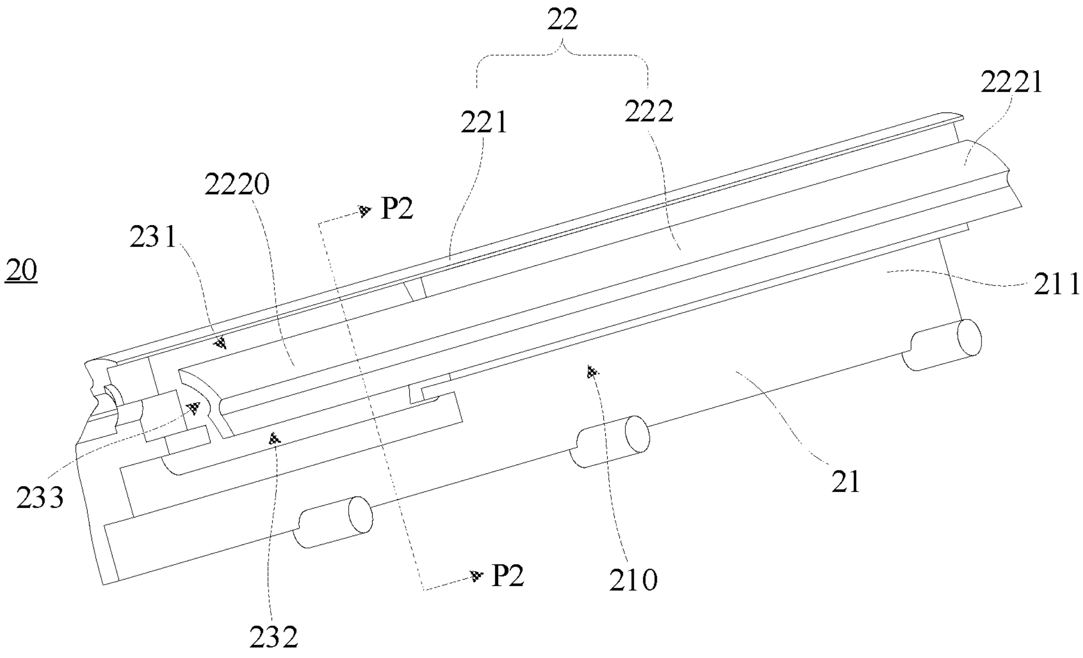
FIG. 3 is a first perspective view of a portion of the housing assembly in accordance with an embodiment of the present disclosure.

FIG. 3 is a first perspective view of a portion of the housing assembly in accordance with an embodiment of the present disclosure.

As illustrated in FIG. 3, the housing assembly 20 includes a main body 21 and a metal frame 22.

The main body 21 is configured to provide support for the electronic components and functional assemblies in the electronic device 100. For example, the main body 21 may be provided with a plurality of recesses, through-holes, projections, and other structures for mounting the electronic components or functional assemblies or for cooperating with a structure of the electronic components or functional assemblies.

The main body 21 includes a side edge 211, the side edge 211 may be an edge of the main body 21. The side edge 211 is connect to the metal frame 22.

The metal frame 22 is disposed around the main body 21. For example, the metal frame 22 may be disposed around the circumference of the main body 21 to form an outer frame of the housing assembly 20. The metal frame 22 is connected to the side edge 211. The material of the metal frame 22 may include metal or alloy. For example, the metal frame 22 may be made of metal such as aluminum alloy, magnesium alloy, etc. The metal frame 22 is relatively stiff to serve as a support in the electronic device 100.

The metal frame 22 includes a bezel portion 221 and a carrying portion 222. The bezel portion 221 is connected to the carrying portion 222. The bezel portion 221 is configured to form an outer frame of the housing assembly 20. The carrying portion 222 is configured to connect to the back cover 50. In other words, the carrying portion 222 is configured to carry the back cover 50 of the electronic device 100, and enabling the connection of the back cover 50 to the housing assembly 20.

For example, the carrying portion 222 may be provided with a bonding adhesive, the bonding adhesive is configured to bond with the back cover 50, and enable the connection of the carrying portion 222 to the back cover 50.

The bezel portion 221 is connected to the side edge 211 of the main body 21 and extends along a thickness direction of the main body 21 and away the main body 21. For example, the bezel portion 221 may extend upwardly along the thickness direction of the main body 21. The bezel portion 221 and the main body 21 may cooperatively define an accommodating portion 210. The accommodating portion 210 can be referred as an accommodating space or an empty three-dimensional area. The carrying portion 222 is disposed along the bezel portion 221 in the accommodating portion 210 and connected to the bezel portion 221 and the main body 21. In other words, the carrying portion 222 is located in the accommodating portion 210, and disposed along a connecting line between the bezel portion 221 and the main body.

A first groove 231 is defined between the carrying portion 222 and the bezel portion 221, a second groove 232 is defined between the carrying portion 222 and the main body 21. The first groove 231 is connected to the second groove 232. The carrying portion 222 includes a metal arm 2220, the metal arm 2220 is at least partially separated away from the bezel portion 221 by the first groove 231, the meal arm 2220 is at least partially separated away from the main body 21 by the second groove 232. In other words, the first groove 231 is defined between the metal arm 2220 and the bezel portion 221, the second groove 232 is defined between the metal arm 2220 and the main body 21.

In the housing assembly 20, the main body 21 and the metal frame 22 may be integrally molded with one another. For example, the main body 21 and the metal frame 22 may be integrally molded by injection molding. The first groove 231, the second groove 232 may be formed by machining on the metal frame 22 after the housing assembly 20 has been integrally molded. For example, the first groove 231 and the second groove 232 may be machined on the metal frame 22 by turning or milling, etc.

Since the first groove 231 is defined between the carrying portion 222 and the bezel portion 221, the metal arm 2220 is spaced apart from the bezel portion 221. In other words, the metal arm 2220 is not connected to the bezel portion 221. Similarly, since the second groove 232 is defined between the carrying portion 222 and the main body 21, the metal arm 2220 is spaced apart from the main body 21. In other words, the metal arm 2220 is not connected to the main body 21.

The metal arm 2220 may be configured to form an antenna radiator 2221. The antenna radiator 2221 may be configured to transmit RF signals for the electronic device 100. For example, the antenna radiator 2221 may be configured to transmit cellular network signals, Wireless Fidelity (Wi-Fi) signals, Global Positioning System (GPS) signals, etc.

A length of the antenna radiator 2221 formed on the metal arm 2220 may be approximately 10 mm to 20 mm, a width of the antenna radiator 2221 may be approximately 1 mm to 2 mm, and a thickness of the antenna radiator 2221 may be approximately 0.5 mm to 2 mm.

As illustrated in FIG. 3, the carrying portion 222 may be defined with a third groove 233. The third groove 233 is connected to the first groove 231 and the second groove 232 so that a free end is formed on one side of the metal arm 2220 facing to the third groove 233. In some embodiments, the third groove 233 may be defined perpendicular to the first groove 231 and the second groove 232, so that the third groove 233 is connected to both the first groove 231 and the second groove 232.

The third groove 233 may also be formed by machining on the metal frame 22 after the housing assembly 20 has been integrally molded. For example, the third groove 233 may be machined on the metal frame 22 by turning or milling, etc.

At least one of the first the first groove 231, the second groove 232, and the third groove 233 may be filled with insulating materials, which can improve the structural strength of the housing assembly 20. For example, the first groove 231, the second groove 232, and the third groove 233 may be filled with plastic, for example, by injection molding the first groove 231, the second groove 232, and the third groove 233.

Figure 4:
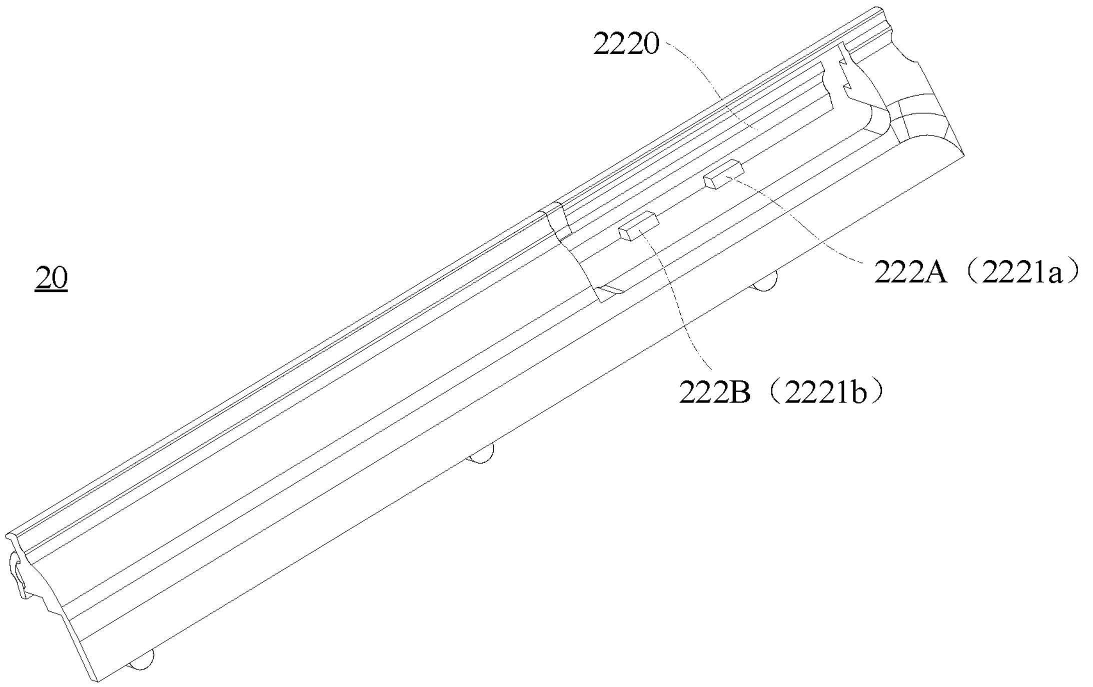
FIG. 4 is a second perspective view of a portion of the housing assembly in accordance with an embodiment of the present disclosure.

The antenna radiator 2221 formed by the metal arm 2220 may be provided with a feeding point 2221*a* and a grounding point 2221*b* (as shown in FIG. 4) being spaced apart from each other. The feeding point 2221*a* is configured for feeding RF signals onto the antenna radiator 2221, and the grounding point 2221*b* is configured for grounding. For example, the electronic device 100 may be provided with a signal source on the circuit board 30, and the signal source is configured to generate RF signals. The feeding point 2221*a* may be electrically connected to the signal source to enable the signal source to feed the RF signals onto the antenna radiator 2221 through the feeding point 2221*a*. In addition, the circuit board 30 of the electronic device 100 may be provided with a grounding point which forms a system ground of the electronic device 100. The grounding point 2221*b* on the antenna radiator 2221 may be electrically connected to the grounding point provided on the circuit board 30 to achieve grounding of the antenna radiator 2221.

It should be noted that the feeding point may also be referred as feed point or feed in point, etc., and the grounding point may also be referred as ground feed point, ground return point or ground, etc.

FIG. 4 is a second perspective view of a portion of the housing assembly 20 in accordance with an embodiment of the present disclosure.

As illustrated in FIG. 4, the antenna radiator 2221 formed by the metal arm 2220 may be provided with a first metal protrusion 222A and a second metal protrusion 222B. For example, the first metal protrusion 222A and the second metal protrusion 222B may be metal blocks formed on the metal arm 2220. In at least one embodiment, the feeding point 2221*a* provided on the antenna radiator 2221 includes the first metal protrusion 222A, the grounding point 2221*b* provided on the antenna radiator 2221 includes the second metal protrusion 222B.

The first metal protrusion 222A may be electrically connected to the signal source provided on the circuit board 30 by means of a metal shrapnel or a metal screw, etc. The second metal protrusion 222B may be electrically connected to the grounding point provided on the circuit board 30 by means of a metal shrapnel or a metal screw, etc.

Figure 5:
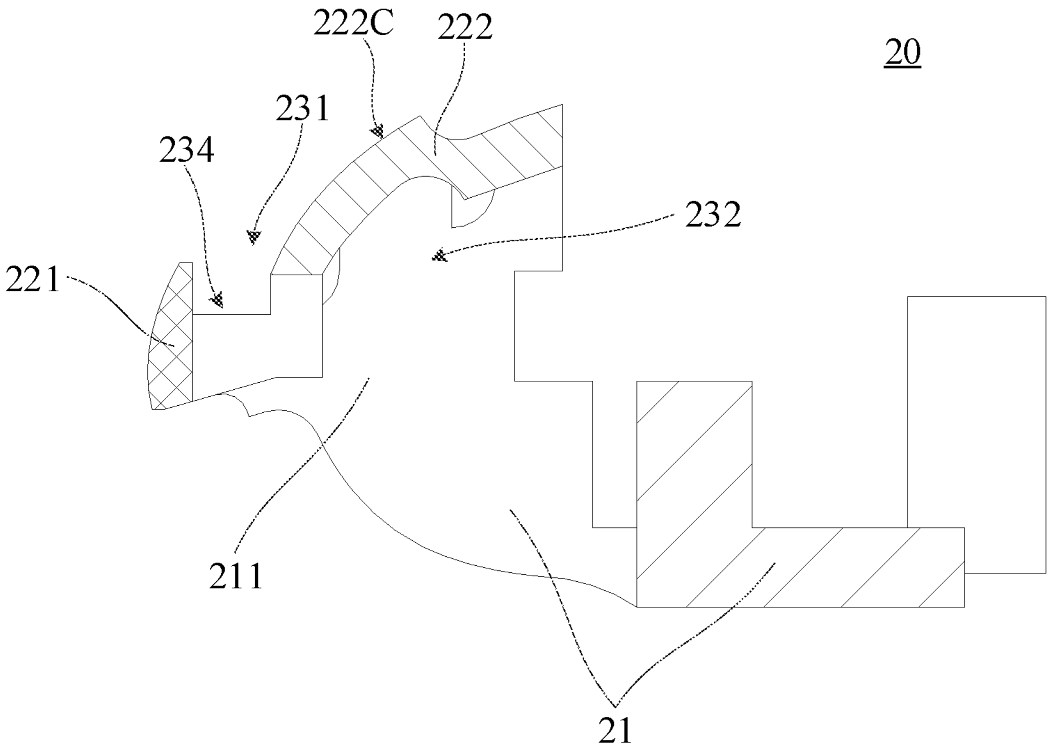
FIG. 5 is a section view of the housing assembly along with profile line P2-P2 shown in FIG. 3.

FIG. 5 is a section view of the housing assembly along with profile line P2-P2 shown in FIG. 3.

As illustrated in FIG. 5, to make the connection between the carrying portion 222 and the rear cover 50 of the electronic device 100 more stable, the bonding surface between the carrying portion 222 and the rear cover 50 can be designed. An arc-shaped carrying surface 222C can be formed on the side of the carrying portion 222 back from the main body 21. It is understood that the arc-shaped carrying surface 222C can increase the area of the bonding surface between the carrying portion 222 and the rear cover 50, thus making the bonding between the carrying portion 222 and the rear cover 50 more stable. In some embodiments, the thickness of the carrying portion 222 increases non-linearly in a direction away from the side edge 211 of the main body 21. In other words, the thickness of the carrying portion 222 increases unevenly In some embodiments, the height of the second groove 232 increases non-linearly in a direction away from the side edge 211 of the main body 21. In other words, the height of the second groove 232 increases unevenly. In some embodiments, the height of the second groove 232 may vary in the same way as the thickness of the carrying portion 222. Thereby, it is possible to make the thickness of the metal arm 2220 formed on the carrying portion 222 the same along its width so that the current on the antenna radiator 2221 is uniformly distributed along its width when transmitting the RF signals, which improves the performance of the antenna radiator 2221 when transmitting the RF signals.

Refer to FIG. 5, wherein the carrying portion 222 is defined with a recess 234 at the connection with the bezel portion 221. The recess 234 is defined between the carrying portion 222 and the bezel portion 221. The first groove 231 may be connected to the recess 234. Wherein the first groove 231 has a same width as the recess 234, which forms a smooth connection of the load carrying portion 222 with the bezel portion 221.

According to the housing assembly 20 provided in the present disclosure, since a metal arm 2220 is formed on the metal frame 22, the metal arm 2220 can form an antenna radiator 2221, the antenna radiator 2221 can be configured to transmit RF signals, and thus the housing assembly 20 can be reused as antennas to achieve the RF signals transmission function, thus a separate antenna radiator is not needed, and effectively saving the internal space of the electronic device 100. In addition, since the antenna radiator 2221 formed by the metal arm 2220 is disposed on the carrying portion 222 which may be covered by the rear cover 50, the first groove 231, the second groove 232 and the third groove 233 are also covered by the rear cover 50 when the electronic device 100 is assembled, there are no antenna slots need to be defined on the bezel portion 221, thus the outer surface of the bezel portion 221 need not be destroyed, which will provide a complete appearance of the bezel portion 221.

In the description of the present disclosure, it is to be understood that terms such as "first" and "second" are used only to distinguish similar objects and are not to be understood as indicating or implying relative importance or implicitly specifying the number of technical features indicated.

The above provides a detailed description of the housing assembly and the electronic device provided in accordance with embodiments of the present disclosure. Specific examples have been applied herein to illustrate the principles and implementation of the present disclosure, and the above description of embodiments is only for helping to understand the present disclosure. At the same time, for a skilled person in the art, according to the idea of the present disclosure, there will be changes in the specific implementation and the scope of application, in summary, the content of this specification should not be understood as a limitation of the present disclosure.

What is claimed is:

1. A housing assembly, comprising:

a main body, comprising a side edge;

a metal frame, wherein the metal frame comprises a bezel portion and a carrying portion, the bezel portion being connected to the side edge and extending along a thickness direction of the main body, the bezel portion and the main body cooperatively defining an accommodating portion, the carrying portion being located in the accommodating portion and disposed along a connecting line between the bezel portion and the main body, the carrying portion comprising a metal arm; and a first groove defined between the metal arm and the bezel portion, and a second groove defined between the meal arm and the main body, wherein the first groove is connected to the second groove, the metal arm being configured to form an antenna radiator, wherein a thickness of the carrying portion increases non-linearly in a direction away from the side edge of the main body, and an arc-shaped carrying surface is formed on the side of the carrying portion back from the main body.

2. The housing assembly according to claim 1, wherein a third groove is defined in the carrying portion, the third groove being connected to the first groove and the second groove, and a free end is formed on one side of the metal arm facing the third groove.

3. The housing assembly according to claim 2, wherein the first groove, the second groove, and the third groove are filled with insulating materials.

4. The housing assembly according to claim 1, wherein a feeding point and a grounding point are provided on the antenna radiator and spaced apart from each other.

5. The housing assembly according to claim 4, wherein the feeding point comprises a first metal protrusion provided on the antenna radiator, and wherein the grounding point comprises a second metal protrusion provided on the antenna radiator.

6. The housing assembly according to claim 1, wherein a height of the second groove increases non-linearly in a direction away from the side edge of the main body, and wherein a thickness of the metal arm formed on the carrying portion is uniform along the metal arm's width.

7. The housing assembly according to claim 1, wherein a recess is defined between the carrying portion and the bezel portion, and wherein the first groove has a same width as the recess.

8. The housing assembly according to claim 1, wherein the main body and the metal frame are integrally molded with one another, the first groove and the second groove being machined grooves on the metal frame after the housing assembly has been integrally molded.

9. The housing assembly according to claim 1, wherein a length of the antenna radiator formed on the metal arm is approximately 10 mm to 20 mm, a width of the antenna radiator is approximately 1 mm to 2 mm, and a thickness of the antenna radiator is approximately 0.5 mm to 2 mm.

10. An electronic device, comprising a housing assembly and a back cover, wherein the housing assembly comprising:

a main body comprising a side edge;

a metal frame comprising a bezel portion and a carrying portion, the bezel portion being connected to the side edge and extending along a thickness direction of the main body, the bezel portion and the main body cooperatively defining an accommodating portion, the carrying portion being located in the accommodating portion disposed along a connecting line between the bezel portion and the main body, the carrying portion comprising a metal arm;

a first groove defined between the metal arm and the bezel portion, and a second groove defined between the metal arm and the main body, wherein the first groove is connected to the second groove, the metal arm being configured to form an antenna radiator; and the back cover being connected to the carrying portion and the antenna radiator being covered by the back cover, wherein the main body and the metal frame are integrally molded with one another, the first groove and the second groove being machined grooves on the metal frame after the housing assembly has been integrally molded.

11. The electronic device according to claim 10, wherein a third groove is defined in the carrying portion, the third groove being connected to the first groove and the second groove, and a free end is formed on one side of the metal arm facing the third groove.

12. The electronic device according to claim 11, wherein the first groove, the second groove, and the third groove are filled with insulating materials and covered by the back cover.

13. The electronic device according to claim 10, wherein a feeding point and a grounding point are provided on the antenna radiator and spaced apart from each other.

14. The electronic device according to claim 13, wherein the feeding point comprises a first metal protrusion provided on the antenna radiator, and wherein the grounding point comprises a second metal protrusion provided on the antenna radiator.

15. The electronic device according to claim 10, wherein a thickness of the carrying portion increases non-linearly in a direction away from the side edge of the main body, and an arc-shaped carrying surface is formed on the side of the carrying portion back from the main body.

16. The electronic device according to claim 15, wherein a height of the second groove increases non-linearly in a direction away from the side edge of the main body, the thickness of the metal arm formed on the carrying portion is uniform across a width of the metal arm.

17. The electronic device according to claim 10, wherein a recess is defined between the carrying portion and the bezel portion, a width of the first groove and the recess being the same.

18. The electronic device according to claim 10, wherein a length of the antenna radiator formed on the metal arm is approximately 10 mm to 20 mm, a width of the antenna radiator is approximately 1 mm to 2 mm, and a thickness of the antenna radiator is approximately 0.5 mm to 2 mm.

* * * * *